(12) United States Patent
Ginzburg et al.

(10) Patent No.: US 12,241,453 B2
(45) Date of Patent: Mar. 4, 2025

(54) ROTATION LIMIT DETECTOR

(71) Applicant: Siemens Gamesa Renewable Energy A/S, Brande (DK)

(72) Inventors: Boris Ginzburg, Brande (DK); Soeren Adrian Schmidt, Vejle (DK)

(73) Assignee: SIEMENS GAMESA RENEWABLE ENERGY A/S, Brande (DK)

( * ) Notice: Subject to any disclaimer, the term of this patent is extended or adjusted under 35 U.S.C. 154(b) by 182 days.

(21) Appl. No.: 18/012,677

(22) PCT Filed: Jun. 21, 2021

(86) PCT No.: PCT/EP2021/066790
§ 371 (c)(1),
(2) Date: Dec. 23, 2022

(87) PCT Pub. No.: WO2022/002659
PCT Pub. Date: Jan. 6, 2022

(65) Prior Publication Data
US 2023/0272778 A1    Aug. 31, 2023

(30) Foreign Application Priority Data
Jun. 30, 2020    (EP) .................................. 20183112

(51) Int. Cl.
*F03D 17/00* (2016.01)
*F03D 7/02* (2006.01)

(52) U.S. Cl.
CPC ........... *F03D 17/00* (2016.05); *F03D 7/0204* (2013.01); *F05B 2270/329* (2013.01)

(58) Field of Classification Search
CPC . B62D 5/04; F16K 31/048; E06B 9/68; F03D 7/0204; F03D 7/0212
See application file for complete search history.

(56) References Cited

U.S. PATENT DOCUMENTS 10,100,810 B2 * 10/2018 Frederiksen .......... F03D 7/0244
10,634,119 B2 * 4/2020 Pecher .................... F03D 17/00
(Continued)

FOREIGN PATENT DOCUMENTS

| CN | 108150354 A | | 6/2018 |
| JP | 2008095664 A | * | 4/2008 |
| WO | 2017121433 A1 | | 7/2017 |

OTHER PUBLICATIONS

PCT International Preliminary Report on Patentability mailed Jun. 8, 2022 corresponding to PCT International Application No. PCT/EP2021/066790 filed Jun. 21, 2021.

*Primary Examiner* — Justin D Seabe
(74) *Attorney, Agent, or Firm* — Schmeiser, Olsen & Watts LLP

(57) ABSTRACT

A rotation limit detector, wind turbine and method to detect a limit of rotation of a toothed ring of a rotating assembly includes a pinion mounted on a primary shaft to engage with the toothed ring; a transmission system configured to convert rotation of the primary shaft into rotation of a secondary shaft; a first switch actuator mounted on the secondary shaft, and a first switch for inclusion in a control circuit, wherein the first switch actuator is configured to actuate the first switch when the extent of rotation of the toothed ring has reached a predefined limit in a clockwise direction; and a second switch actuator mounted on the secondary shaft, and a second switch for inclusion in the control circuit, wherein the second switch actuator actuates the second switch when the extent of rotation of the toothed ring has reached a predefined limit in a counter-clockwise direction.

14 Claims, 3 Drawing Sheets

(56) References Cited

U.S. PATENT DOCUMENTS 10,934,998 B2 * 3/2021 Glavind .................. F03D 7/042
11,248,583 B2 * 2/2022 Glavind ................ F03D 7/0204

* cited by examiner

ROTATION LIMIT DETECTOR

CROSS-REFERENCE TO RELATED APPLICATIONS

This application claims priority to PCT Application No. PCT/EP2021/066790, having a filing date of Jun. 21, 2021 which claims priority to EP Application No. 20183112.0, having a filing date of Jun. 30, 2020, the entire contents both of which are hereby incorporated by reference.

FIELD OF TECHNOLOGY

The following relates to a rotation limit detector configured to detect a limit of rotation of a toothed ring of a rotating assembly.

BACKGROUND

A nacelle mounted on top of a wind turbine tower will be yawed in order to aim the hub into the wind, so that the aerodynamic rotor is optimally oriented to extract as much energy as possible from the wind, but also to avoid excessive blade loading. Yaw error corrections are usually only in the order of a few degrees, since the wind direction generally does not suddenly change by a large amount. It is common for a yaw drive to be able to turn the nacelle through at least one complete rotation, i.e., through at least 360°, and there are wind turbines with yaw drives that can turn the nacelle through several complete rotations.

Usually, multiple power export cables from the wind turbine generator pass from the nacelle through the tower to the base of the wind turbine before entering a sub-sea or underground pipe. The cables essentially hang from the nacelle and are allowed to twist as the yaw system turns the nacelle, in clockwise and counter-clockwise directions. Since the power export cables may be quite heavy and thick, it is important to avoid a situation in which the degree of twist results in the cables becoming tangled to the extent that a corrective yawing motion cannot "untwist" them. If the power cables become tangled or blocked, the wind turbine must be halted to avoid damage and stays out of operation until the situation is remedied. This can lead to significant downtime, particularly in the case of an offshore wind turbine for which maintenance procedures are more difficult to schedule.

It is known to monitor the yaw state of a wind turbine by deploying a yaw encoder and/or a rotation tracker to estimate the angular position of the yaw ring and to detect when the yaw ring has been turned through a maximum angular range. However, a yaw encoder may fail for a number of reasons, but its failure may go undetected. A faulty yaw encoder may cease to report any data, or it may report erroneous data. A fault in a rotation tracker of the type proposed in CN108150354A may go undetected, for example if a mechanical cam follower should fail, a cam count event (one complete rotation of the pinion gear) will go undetected. A corrective yaw manoeuvre following a rotation limit signal from the rotation tracker may therefore be based on erroneous yaw encoder data and may result in the nacelle being yawed in the wrong direction and/or by the wrong amount. Even if the yaw direction is by chance correct, the extent of the corrective yaw manoeuvre may be excessive or insufficient.

Such situations can lead to severe damage to the power cables, and the necessary repairs can be costly and time-consuming (taking weeks or even months to repair), in addition to the lost revenue during the enforced downtime.

An aspect therefore relates to provide an improved way of avoiding damage from excessively twisted power cables of a wind turbine.

SUMMARY

According to embodiments of the invention, the rotation limit detector is configured to monitor the rotation of a toothed ring of a rotating assembly, for example a wind turbine yaw assembly, and comprises a pinion mounted on a primary shaft and configured to engage with the toothed ring. The rotation limit detector further comprises a transmission system that is configured to convert rotation of the primary shaft into rotation of a secondary shaft according to a gear ratio. The transmission system of the inventive rotation limit detector applies an inverse gear ratio to convert a full rotation of the primary shaft into a fraction of a full rotation of the secondary shaft.

The rotation limit detector further deploys—for each of the clockwise and counter-clockwise directions—a switch actuator and a corresponding switch for inclusion in a control circuit. The clockwise switch actuator and the counter-clockwise switch actuator are both fixedly mounted on the secondary shaft, so that these rotate as the secondary shaft rotates. Each switch actuator can therefore move towards or away from its switch, depending on the direction in which the toothed ring is being turned.

In the inventive rotation limit detector, a first switch is arranged at a position that corresponds to a predefined rotation limit of the toothed ring in the clockwise direction, so that the clockwise switch actuator actuates the first switch when the toothed ring has been rotated to its predefined limit in the clockwise direction; and a second switch is arranged at a position that corresponds to a predefined rotation limit of the toothed ring in the counter-clockwise direction, so that the counter-clockwise switch actuator actuates the second switch when the toothed ring has been rotated to its predefined limit in the counter-clockwise direction.

An advantage of the inventive rotation limit detector is that it can be used not only to identify the critical situation which arises when the toothed ring has reached a predefined rotation limit, but it also identifies the direction in which the toothed ring was being turned before it reached that rotation limit. Based on this explicit information, a controller can implement a corrective measure, for example to turn the toothed ring in the opposite direction. Since the controller does not have to deduce the rotation direction from possibly erroneous or out-of-date information from a yaw encoder, but instead receives the correct information directly from the rotation limit detector, the controller will not inadvertently cause damage by erroneously turning the toothed ring further in the same direction.

According to embodiments of the invention, the wind turbine is constructed according to a common design, with a nacelle mounted on top of a tower, and with a yaw system to turn the entire nacelle so that a hub and aerodynamic rotor at the front of the nacelle can be oriented into the wind. The yaw system comprises a toothed ring mounted at the interface between the nacelle and the upper level of the tower, and a number of yaw drive units arranged to effect a rotation of the toothed ring. The wind turbine also comprises an embodiment of the inventive rotation limit detector to monitor the rotation of the toothed ring, and a control circuit incorporating the switches of the rotation limit detector.

In an exemplary embodiment of the invention, the first switch of the rotation limit detector completes an electrical circuit until actuated by the clockwise switch actuator; and the second switch of the rotation limit detector completes an electrical circuit until actuated by the counter-clockwise switch actuator. In other words, actuation of a switch causes the corresponding electrical circuit to be interrupted (opened). These electrical circuit(s) can be part of the overall control circuit of the yaw system. The controller can then issue commands to carry out remedial action as necessary. For example, when a switch of the rotation limit detector is opened, the yaw control circuit can disconnect a drive motor from a power supply in order to inhibit further motion of the toothed ring. This configuration of switches and control circuitry allows for a failsafe solution, e.g., loss of power due to any other fault will also have the effect of triggering the limit signal, resulting in a "safe" situation.

An advantage of the inventive wind turbine is that the direction of rotation of the yaw motion can be identified in a critical situation, for example a situation in which the yaw assembly has been halted due to excessive cable twist. Identification of the direction of rotation is possible since each switch actuator is associated with one of the two possible rotation directions. A suitable corrective measure can then be taken, for example the yaw assembly can be operated in the reverse direction to untwist the power cables.

According to embodiments of the invention, the method of operating a wind turbine yaw assembly comprises the steps of mounting an embodiment of the inventive rotation limit detector to the yaw assembly such that its pinion engages with the toothed ring of the yaw assembly; turning the toothed ring of the yaw assembly in a clockwise direction and/or a counter-clockwise direction as long as a switch is not actuated; and determining the direction of rotation of the toothed ring when a switch is actuated.

An advantage of the inventive method is that it removes the guesswork associated with the conventional art methods, since the rotation limit detector provides the important information regarding the direction of rotation of the toothed ring. Instead of having to rely on possibly erroneous or out-of-date information from an encoder, the rotation limit detector accurately and unambiguously reports the direction of rotation of the toothed ring when this has been turned to its limit.

In the following, it may be assumed that the rotatable assembly is the yaw system of a wind turbine, and the toothed ring is the yaw ring which is generally mounted at the interface between the nacelle and the uppermost level of the wind turbine tower. The toothed ring is turned by a set of yaw drive units. Without restricting embodiments of the invention in any way, the toothed ring may simply be referred to in the following as a "yaw ring". The term "pinion" is used in reference to the rotation limit detector, and is distinct from the pinion of a yaw drive unit.

The yaw ring of a wind turbine can be turned clockwise and counter-clockwise so that the aerodynamic rotor can always be turned to face directly into the wind. During operation of a wind turbine, the wind direction can change frequently. A change in wind direction is evaluated by a controller, which issues appropriate yaw correction commands to the yaw system. Depending on the progression of wind direction, a sequence of yaw corrections may result in the yaw ring being turned through more than one complete rotation. A power cable suspension arrangement is generally designed to accommodate a generous rotation range but must be protected from excessive rotation for the reasons given in the introduction. In the following, the terms "allowed rotation range", permitted range", "permitted angular range of rotation" and "maximum angular range" have the same meaning, and refer to the rotation limit or twist limit of the yaw ring. As indicated above, it is common for a yaw drive to be able to turn the yaw ring (and therefore the nacelle) through several complete rotations.

In an exemplary embodiment of the invention, a controller of the wind turbine comprises an override arrangement that is configured to control the yaw drive units in a specific manner following actuation of a switch of the rotation limit detector.

The rotation limit detector can be constructed in any suitable manner. The pinion teeth of the rotation limit detector should be similar in size and shape to the teeth of the toothed ring so that the teeth can reliably engage. The rotation limit detector is a compact device that can be mounted in the space available at the level of the yaw ring of a wind turbine. In a particularly exemplary embodiment of the invention, the transmission system of the rotation limit detector includes a gearbox with bevel gears so that the secondary shaft can be perpendicular to the primary shaft, allowing a favourably compact construction. In an exemplary realisation, clockwise motion of the yaw ring results in clockwise motion of the secondary shaft, and counter-clockwise motion of the yaw ring results in counter-clockwise motion of the secondary shaft.

The yaw ring and the pinion are related by a gear ratio, so that one complete rotation of the yaw ring results in multiple rotations of the primary shaft. According to embodiments of the invention, the transmission system of the rotation limit detector applies an inverse gear ratio to convert a full rotation of the primary shaft to a fraction of a full rotation of the secondary shaft. For example, the transmission system of the rotation limit detector can be constructed so that the maximum rotation range of the yaw ring (its permitted angular range of rotation in either direction, e.g., 360°, 720°, 800° etc.) turns the secondary shaft by less than 180°. With such a favourable construction, the rotation of the secondary shaft can be used to determine whether the yaw ring has reached its rotation limit in one direction (e.g. the clockwise direction), but also to determine whether the yaw ring has reached its rotation limit in the opposite direction (i.e. the counter-clockwise direction).

It shall be understood that the first switch—i.e., the "clockwise limit" switch—is arranged so that it can only be actuated by the first switch actuator. Similarly, the second switch—i.e., the "counter-clockwise limit" switch—is arranged so that it can only be actuated by the second switch actuator.

A switch and its switch actuator could be realised in any suitable manner, for example in the form of a proximity sensor using magnetic attraction, in the form of an optical sensor, etc. Regardless of the manner in which a switch and its switch actuator are realised, the switch is actuated to invert an electrical circuit state (e.g., to open or interrupt a branch of a control circuit) when the toothed ring has reached its twist limit in the corresponding direction. In an exemplary embodiment of the invention, a switch is spring-loaded, and the corresponding switch actuator is constructed to effect a movement of the spring-loaded switch between a closed state and an open state. In a particularly exemplary embodiment of the invention, a switch actuator is realised as a disc cam or plate cam mounted on the secondary shaft, and the switch is arranged as a follower of the cam. The cam is shaped so that the corresponding switch is opened when the cam reaches its maximum displacement, i.e., when the yaw ring has reached its predefined limit of rotation in that direction.

When a switch is opened, this interrupts or breaks an electrical circuit. In an exemplary embodiment of the invention, the switches of the rotation limit detector are incorporated in a control circuit of the yaw system, which control circuit is configured to disable motion of the yaw drives in the clockwise direction when the "clockwise" switch is opened, and to disable motion of the yaw drives in the counter-clockwise direction when the "counter-clockwise" switch is opened.

The inventive method comprises an initial step of determining a permitted angular range of rotation for a yaw ring of a specific wind turbine type and configuring the transmission system of the rotation limit detector on the basis of the permitted angular range. In an exemplary embodiment of the invention, the transmission system is adjustable, so that a suitable gear ratio can be selected depending on the relevant parameters such as yaw ring teeth count, permitted rotational range, etc. Alternatively, the gear-ratio of the transmission system may be fixed, and rotation limit detector can be tailored to an application by mounting suitable cams onto the secondary shaft. For example, a variety of cams can be provided, each with a different angular range, and the customer can select the appropriate cams (one for the clockwise direction and one for the counter-clockwise direction), and mount these onto the secondary shaft. Such embodiments allow a rotation limit detector to be configured prior to mounting it to a yaw assembly.

In a particularly exemplary realisation, a cam can be constructed to have a cut-out or recess at its deepest region, i.e., in the region corresponding to maximum displacement of the follower or switch. The recess makes it possible for the spring-loaded switch to move—e.g., to interrupt the corresponding branch of a control circuit—when the yaw ring has reached its limit of rotation in that direction.

In the conventional art systems, it is usual to disconnect power to the yaw drives when a rotation tracker reports a rotation limit state. Usually, a spring-actuated motor brake will automatically engage when power is removed from a yaw drive motor, effectively preventing the yaw ring from being turned any further. As explained above, the conventional art systems rely on yaw encoder data when re-applying power to the yaw drives in order to set their rotation direction with the intention of untwisting the power cables, but erroneous yaw encoder data may lead to damage. The inventive rotation limit detector allows the control circuit to be designed so that power supply to the yaw motors is not interrupted when a switch is opened. Instead, the switches of the rotation limit detector can simply prevent the yaw drive motors from turning in the same direction that led to the limit state. A switch of the inventive rotation limit detector may therefore be referred to as a "yaw stop switch", since it has the effect of preventing further yaw motion in that direction, or as a "reverse direction switch", since actuation of a switch is effectively followed by a reversal in yaw direction.

A significant advantage of embodiments of the invention is that it can reliably avoid an unsafe situation (i.e., excessive cable twist) without removing power from the yaw drives.

The signal received from the yaw limit detector can be used as an input to a safety PLC (programmable logic controller), i.e., a dedicated safety control system that is independent of the turbine controller), but it can also be used to trigger simple logic—for example an arrangement of relays and contactors—that can be independent of the wind turbine controller.

A controller of the wind turbine can be configured to respond to events triggered by the rotation limit detector. For example, the switches of the rotation limit detector can be incorporated in a yaw control circuit that is part of a control arrangement. The wind turbine controller is configured to respond to the actuation of a switch of the rotation limit detector. For example, the wind turbine controller can easily identify the direction of rotation of the yaw ring at the time of actuation of a switch of the rotation limit detector, depending on which of the "clockwise limit" and "counter-clockwise limit" branches of the control circuit were affected. The controller can then operate the yaw assembly to turn the toothed ring in the opposite direction in order to untwist the power cables.

BRIEF DESCRIPTION

Some of the embodiments will be described in detail, with reference to the following figures, wherein like designations denote like members, wherein.

DETAILED DESCRIPTION

Figure 1:
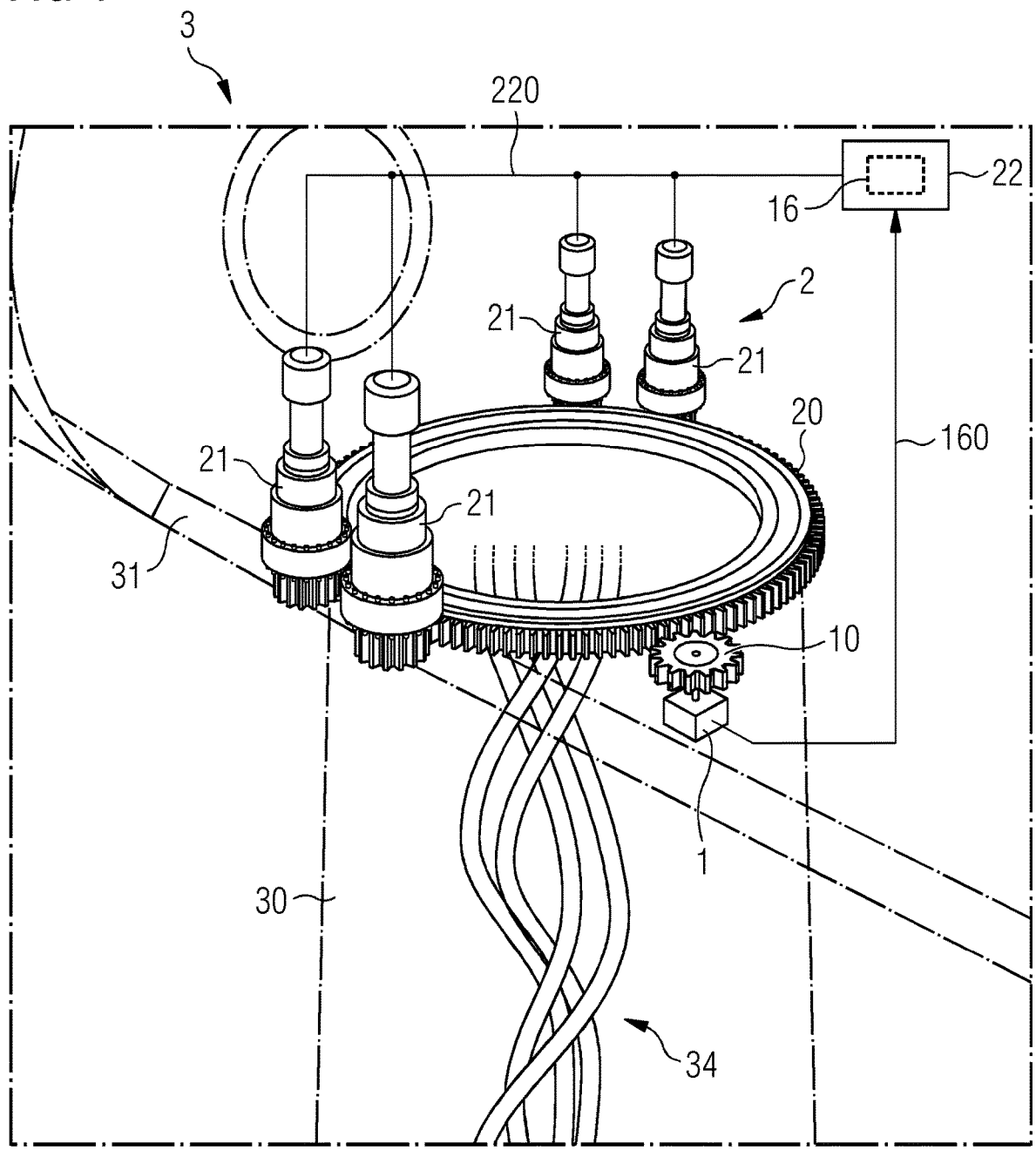
FIG. 1 shows an embodiment of the inventive rotation limit detector mounted in a yaw assembly of a wind turbine.

FIG. 1 shows the principle elements of a yaw assembly 2 in a wind turbine 3. The diagram shows a yaw ring 20 about an opening in the base of a nacelle 31, near the top of a tower 30. Several yaw drive units 21 engage with the yaw ring 20 to turn it—and the nacelle 31—in a clockwise or counter-clockwise direction, depending on a yaw reference 220 issued by a yaw controller 22.

The diagram also indicates power cables 34 suspended from a generator downwards into the tower 20. It is important that the power cables 34 be protected from being overly twisted during yawing manoeuvres, otherwise the cables 34 can be damaged, leading to costly repairs and loss of revenue.

The diagram shows an embodiment of the inventive rotation limit detector 1 mounted so that its pinion 10 engages with the yaw ring 20. This device can be an adaptation of an off-the-shelf product to include switch actuators and a control circuit 16 as described above.

Figure 2:
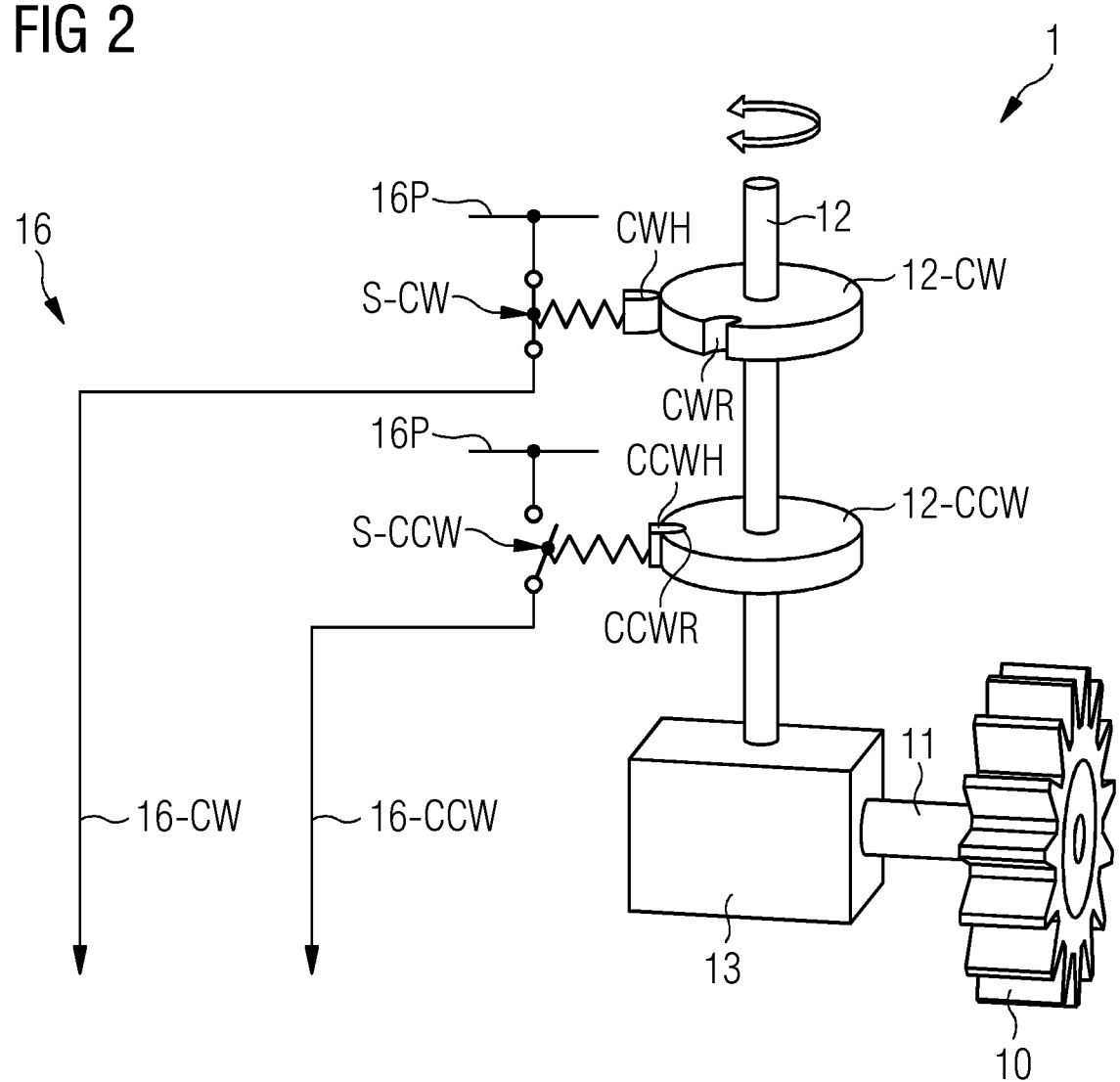
FIG. 2 shows an exemplary realisation of the inventive rotation limit detector.

An exemplary realisation of the inventive rotation limit detector 1 is shown in FIG. 2. The diagram shows a pinion 10 with teeth that are shaped to engage with the teeth of the yaw ring 20. The pinion 10 is mounted on a primary shaft 11, and rotation of the primary shaft 11 is converted by a transmission unit 13 into rotation of a secondary shaft 12.

The rotation limit detector 1 is configured so that its transmission unit 13 converts the permitted rotation range of a yaw ring such as that shown in FIG. 1 into a partial rotation of the secondary shaft 12. For example a permitted rotation range of 360° in one direction may translate to a secondary shaft rotation through 160° in a corresponding direction; a permitted rotation range of 720° may translate to a secondary shaft rotation through 120°, etc.

It shall be understood that the inventive rotation limit detector 1 fulfils the usual function of a rotation tracker, whose purpose it is to detect a rotation limit condition. However, unlike the conventional art devices, the inventive rotation limit detector 1 reacts to two distinct events: when the yaw ring reaches its limit of rotation in the clockwise direction; and when the yaw ring reaches its limit of rotation in the counter-clockwise direction.

The clockwise switch S-CW is included in the circuit path that connects power 16P to the yaw drives in the clockwise direction, and the counter-clockwise switch S-CCW is included in the circuit path that connects power 16P to the yaw drives in the counter-clockwise direction. In this way, the circuit 16 can prevent the yaw drive units from turning any further in the direction that led to opening of a switch S-CW, S-CCW, but does not prevent the yaw drive units from turning in the opposite direction. A major benefit of embodiments of the invention is that the yaw controller can still actuate the yaw drives after a rotation limit state is detected, and the yaw drives can only be turned in the opposite or "safe" direction.

This is in contrast to the conventional art systems, which shut off power supply to the yaw drive motors in response to a rotation limit event, and which may erroneously choose the wrong direction in which to turn the yaw drives.

The rotation limit detector 1 is incorporated in the yaw control circuit 16 by appropriate connections 160 as indicated schematically in the diagram.

In this exemplary embodiment, two cams 12-CW, 12-CCW are mounted one above the other on the secondary shaft 12, and two switches S-CW, S-CCW that are electrically connected in a control circuit 16 are arranged accordingly so that each switch is paired with one of the cams. The control circuit 16 is connected to a power supply 16P as indicated here in a very schematic manner. It shall be understood that the control circuit 16 can be implemented in any suitable manner as will be known to the skilled person, and that this diagram only illustrates the underlying principle.

When an extreme twist event occurs—the nacelle as reached its twist limit in one direction—the head CWH, CCWH, of a switch S-CW, S-CCW slips into the recess CWR, CCWR of the corresponding cam 12-CW, 12-CCW. That switch opens, thereby interrupting the corresponding branch of a control circuit 16. In this way, the control circuit 16 of the inventive rotation limit detector reports the occurrence of an extreme twist event and also reports the direction of twist. The control circuit 16 may be incorporated as part of a more complex three-phase yaw drive motor control circuit, and only the relevant portions of the circuit are shown here. When a twist limit event occurs, the power supply to the drive units remains connected, and a yaw controller can react to the event by reversing the yawing direction.

An off-the-shelf rotation limit detector can deploy the same arrangement of pinion 10, transmission 13, secondary shaft 12, etc. Embodiments of the invention lies in the realisation that the device can be further exploited by mounting two functionally distinct cams 12-CW, 12-CCW on the secondary shaft 12 as explained above and including functionally distinct switches in the control circuit 16 to report the occurrence of an extreme twist event and—very importantly—to also report the direction of twist. A turbine controller can then untwist the cables without risk of damage, since the yaw drives can only be turned in the "safe" direction. With the inventive rotation limit detector 1 and control circuit 16, the turbine controller will not erroneously turn the nacelle further in the wrong direction, i.e. the "over-twist direction". It follows that embodiments of the invention are advantageous in avoiding the need for expensive manual intervention to untwist the power cables.

Figure 3:
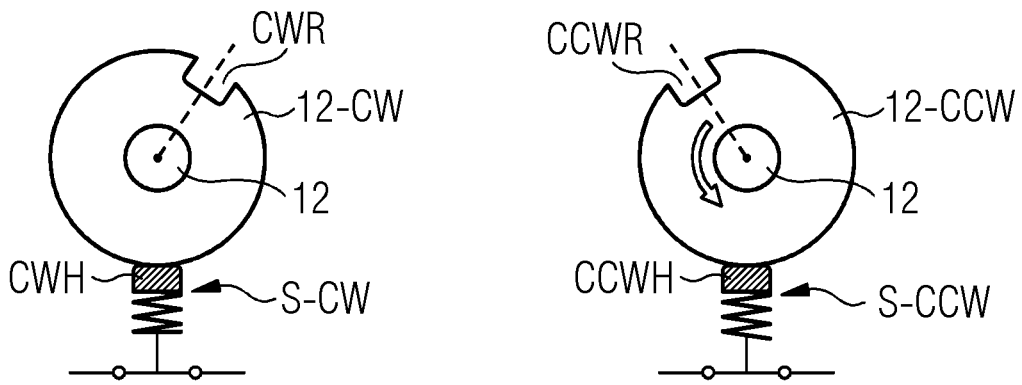
FIG. 3 shows the principle of operation of the inventive rotation limit detector
Figure 4:
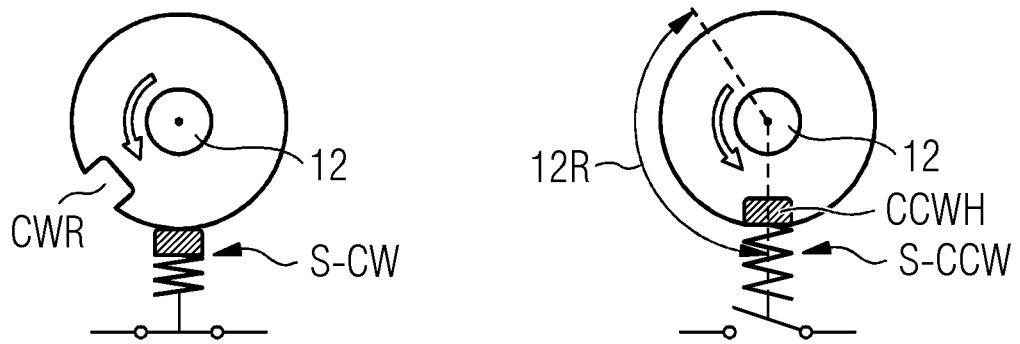
FIG. 4 shows the principle of operation of the inventive rotation limit detector and FIG. 5 illustrates the principle of operation of the inventive rotation limit detector.
Figure 5:
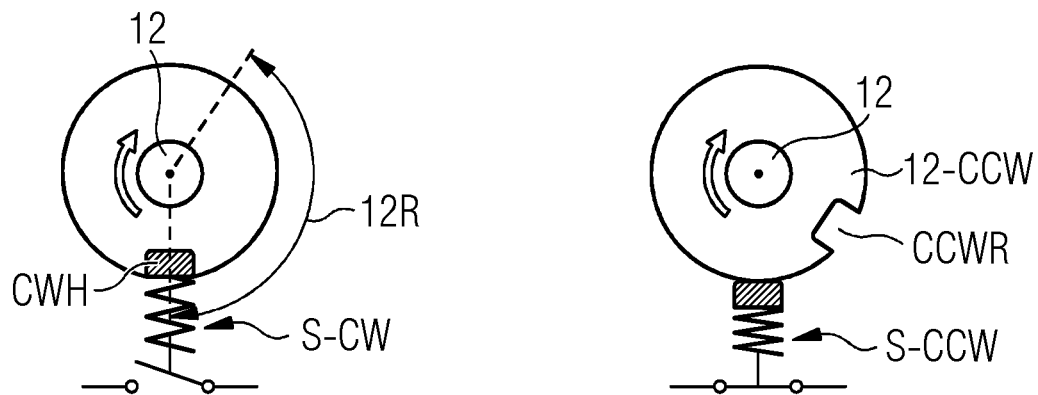

FIG. 3-FIG. 5 are simplified schematics to illustrate the underlying principle of embodiments of the invention. The diagrams show a first cam 12-CW and its corresponding switch S-CW, and a second cam 12-CCW and its corresponding switch S-CCW. The cams 12-CW, 12-CCW are shown separately for the sake of clarity, but it shall be understood that they are stacked one above the other on the secondary shaft 12 of the rotation limit detector 1.

The first cam 12-CW tracks the clockwise rotation of the yaw ring from an initial position of 0° (shown in FIG. 3) to its limit of rotation in the clockwise direction (shown in FIG. 5). The second cam 12-CCW tracks the clockwise rotation of the yaw ring from an initial position of 0° (shown in FIG. 3) to its limit of rotation in the counter-clockwise direction (shown in FIG. 4). Assuming the allowed rotation range of the yaw ring 20 is the same in both directions (e.g. −720° to +720°, the default or initial starting position of a cam is the mirror image of the initial starting position of the other cam. In this case, an angular range of approximately 170° applies to each cam, i.e., if the secondary shaft is turned so that a cam rotates from its initial position (indicated by a dashed line) through 170°, this means that rotation of the yaw ring 20 has reached its predefined limit, and the corresponding switch will engage with its switch actuator.

When the yaw ring is turned clockwise to its limit, the shape of the first "clockwise" cam 12-CW actuates the first switch S-CW by allowing it to open. This interrupts a branch of an electrical circuit 16. In this exemplary embodiment, the cam 12-CW has a recess CWR that engages with the head of the switch S-CW, allowing that spring-loaded switch to open. The effect of opening the switch S-CW is to prevent further motion of the yaw drive units in the clockwise direction.

In this exemplary embodiment, a switch S-CW, S-CCW can only be opened (thus breaking/opening an electrical circuit) when the corresponding cam has moved so far that the spring-loaded switch head CWH, CCWH can extend into the corresponding recess 120 CWR, CCWR. Since the cams 12-CW, 12-CCW are stacked on the secondary shaft 12 and initially aligned as shown in FIG. 3, the "counter-clockwise" cam 12-CCW follows the motion of the "clockwise" cam 12-CW but has no effect on its corresponding switch S-CCW.

Similarly, when the yaw ring is turned counter-clockwise to its limit, the shape of the second cam 12-CW actuates the second switch S-CW by allowing it to open. Here also, the cam 12-CCW has a recess CCWR that engages with the head CCWH of the switch S-CCW to report a twist limit event in the counter-clockwise direction. The effect of opening the switch S-CCW is to prevent further motion of the yaw drive units in the counter-clockwise direction. In this case, the "clockwise" cam 12-CW follows the motion of the "counter-clockwise" cam 12-CCW but has no effect on the other switch S-CW.

In this way, the rotation limit detector 1 can be used to detect a situation in which the yaw ring 20 has been turned so far as to reach a predefined limit. As shown in FIG. 2, when the counter-clockwise switch head CCWH engages with the CCW cam 12-CCW, switch S-CCW is opened.

Similarly, if the clockwise switch head CWH were to engage with the clockwise cam 12-CW, switch S-CW would be opened instead.

Although the present invention has been disclosed in the form of preferred embodiments and variations thereon, it will be understood that numerous additional modifications and variations could be made thereto without departing from the scope of the invention. The rotation limit detector may be constructed with a degree of redundancy, for example, by implementing two switch actuator assemblies for each rotation direction. Alternatively or in addition, a wind turbine may be equipped with a redundant arrangement of two or more rotation limit detectors. In this way, detection of a yaw ring rotation limit may be done in accordance with an appropriate standard such as ISO 13849-1, IEC 62061 etc.

For the sake of clarity, it is to be understood that the use of "a" or "an" throughout this application does not exclude a plurality, and "comprising" does not exclude other steps or elements. The mention of a "unit" or a "module" does not preclude the use of more than one unit or module.

The invention claimed is:

1. A rotation limit detector configured to detect a limit of rotation of a toothed ring of a rotating assembly, and comprising
    a pinion mounted on a primary shaft and configured to engage with the toothed ring;
    a transmission system configured to convert rotation of the primary shaft into rotation of a secondary shaft such that rotation of the secondary shaft through an angular range corresponds to a rotation of the toothed ring through its permitted range in a specific direction, and wherein the transmission system applies an inverse gear ratio to convert a full rotation of the primary shaft to a fraction of a full rotation of the secondary shaft;
    a first switch actuator mounted on the secondary shaft, and a first switch configured for inclusion in a control circuit, wherein the first switch actuator is configured to actuate the first switch when the extent of rotation of the toothed ring has reached a predefined limit in a clockwise direction; and
    a second switch actuator mounted on the secondary shaft, and a second switch configured for inclusion in the control circuit, wherein the second switch actuator is configured to actuate the second switch when the extent of rotation of the toothed ring has reached a predefined limit in a counter-clockwise direction.

2. The rotation limit detector according to claim 1, wherein the first switch and/or the second switch is realised as a spring-loaded switch, and wherein a respective switch actuator is realised to effect a movement of the corresponding spring-loaded switch between a closed state and an open state.

3. The rotation limit detector according claim 1, wherein the first switch actuator and/or the second switch actuator is realised as a cam mounted on the secondary shaft.

4. The rotation limit detector according to claim 3, wherein the cam comprises a recess shaped to enclose a portion of the corresponding spring-loaded switch when the extent of rotation of the toothed ring has reached the predefined limit.

5. The rotation limit detector according to claim 1, wherein the permitted angular range of rotation of the toothed ring in either direction is at least 360°.

6. The rotation limit detector according to claim 1, wherein the angular range of rotation of the secondary shaft comprises at most 180°.

7. The rotation limit detector according to claim 1, comprising duplicate first switch actuators, duplicate second switch actuators, duplicate first switches, and duplicate second switches in a redundant arrangement.

8. A wind turbine comprising at least
    a yaw system, which yaw system comprises a toothed ring mounted at an upper level of a tower and a number of yaw drive units arranged to effect a rotation of the toothed ring; and
    a rotation limit detector, having a pinion mounted on a primary shaft and configured to engage with the toothed ring; a transmission system configured to convert rotation of the primary shaft into rotation of a secondary shaft such that rotation of the secondary shaft through an angular range corresponds to a rotation of the toothed ring through its permitted range in a specific direction, and wherein the transmission system applies an inverse gear ratio to convert a full rotation of the primary shaft to a fraction of a full rotation of the secondary shaft; a first switch actuator mounted on the secondary shaft, and a first switch, wherein the first switch actuator is configured to actuate the first switch when the extent of rotation of the toothed ring has reached a predefined limit in a clockwise direction; and a second switch actuator mounted on the secondary shaft, and a second switch, wherein the second switch actuator is configured to actuate the second switch when the extent of rotation of the toothed ring has reached a predefined limit in a counter-clockwise direction, mounted such that the pinion engages with the toothed ring of the yaw system; and
    a control circuit incorporating the first switch and/or the second switch of the rotation limit detector.

9. The wind turbine according to claim 8, wherein the control circuit is configured to permit only counter-clockwise motion of the yaw drive units upon actuation of the first switch of the rotation limit detector.

10. The wind turbine according to claim 8, wherein the control circuit is configured to permit only clockwise motion of the yaw drive units upon actuation of the second switch of the rotation limit detector.

11. The wind turbine according to claim 8, comprising an additional rotation limit detector in a redundant arrangement.

12. A method of operating a wind turbine yaw assembly, which method comprises the steps of
    mounting the rotation limit detector according to claim 1 to the yaw assembly such that the
    pinion of the rotation limit detector engages with the toothed ring of the yaw assembly; and
    turning the toothed ring of the yaw assembly in a clockwise direction and/or a counter-clockwise direction as long as a respective switch of the rotation limit detector is not actuated.

13. The method according to claim 12, comprising a step of reversing the direction of motion of the toothed ring when the respective switch of the rotation limit detector is actuated.

14. The method according to claim 12, comprising an initial step of determining a permitted angular range of rotation of the toothed ring and configuring the angular range of the secondary shaft of the transmission system of the rotation limit detector on the basis of the permitted angular range.

* * * * *